US007794814B2

(12) United States Patent
Jenkines

(10) Patent No.: US 7,794,814 B2

(45) Date of Patent: Sep. 14, 2010

(54) POLYURETHANE CARPET BACKINGS MADE USING HYDROXYMETHYLATED POLYESTER POLYOLS

(75) Inventor: Randall C. Jenkines, Dalton, GA (US)

(73) Assignee: Dow Global Technologies Inc., Midland, MI (US)

( * ) Notice: Subject to any disclaimer, the term of this patent is extended or adjusted under 35 U.S.C. 154(b) by 534 days.

(21) Appl. No.: 11/663,528

(22) PCT Filed: Oct. 24, 2005

(86) PCT No.: PCT/US2005/038216

§ 371 (c)(1), (2), (4) Date: Mar. 22, 2007

(87) PCT Pub. No.: WO2006/047432

PCT Pub. Date: May 4, 2006

(65) Prior Publication Data

US 2009/0197035 A1 Aug. 6, 2009

Related U.S. Application Data

(60) Provisional application No. 60/622,219, filed on Oct. 25, 2004.

(51) Int. Cl.

*D05C 17/02* (2006.01)
*D05C 15/00* (2006.01)
*A47G 27/00* (2006.01)

(52) U.S. Cl. .............................. 428/97; 428/95; 156/72

(58) Field of Classification Search .................. 428/95, 428/97; 156/72

See application file for complete search history.

(56) References Cited

U.S. PATENT DOCUMENTS 3,427,334 A 2/1969 Belner
3,427,335 A 2/1969 Herold
4,269,159 A 5/1981 Skinner et al.
4,696,849 A 9/1987 Mobley et al.
4,843,054 A 6/1989 Harper
4,966,920 A 10/1990 Gainer et al.
5,300,535 A 4/1994 Takeyasu et al.
5,451,631 A 9/1995 Guo
5,552,486 A 9/1996 Guo et al.
5,648,559 A 7/1997 Hager
5,786,514 A 7/1998 Shen et al.
5,811,566 A 9/1998 Watabe et al.
5,854,386 A 12/1998 Shen et al.
5,856,369 A 1/1999 Jorgenson et al.
6,018,017 A 1/2000 Le-Khac
6,075,064 A 6/2000 Muller et al.
6,096,401 A * 8/2000 Jenkines ...................... 428/95
6,171,678 B1 * 1/2001 Holeschovsky et al. ....... 428/97
6,180,686 B1 * 1/2001 Kurth .......................... 521/51
6,255,537 B1 7/2001 Hayashi et al.
6,355,845 B1 3/2002 Clement et al.
6,429,342 B1 8/2002 Clement et al.
6,465,569 B1 * 10/2002 Kurth .......................... 525/51
6,495,611 B1 12/2002 Arlt et al.
6,552,163 B1 4/2003 Clement et al.
6,555,199 B1 * 4/2003 Jenkines ...................... 428/97
6,780,895 B2 * 8/2004 Holechovsky et al. ...... 521/133
6,962,636 B2 * 11/2005 Kurth et al. ................... 156/72
6,979,477 B2 * 12/2005 Kurth et al. ................. 427/426
7,063,877 B2 * 6/2006 Kurth et al. ................... 428/95
2002/0090488 A1 7/2002 Kurth et al.
2002/0119321 A1 8/2002 Kurth et al.
2002/0121328 A1 9/2002 Kurth et al.
2003/0114627 A1 * 6/2003 Holeschovsky et al. ....... 528/44
2003/0225244 A1 12/2003 Nobori et al.
2005/0070620 A1 * 3/2005 Herrington et al. .......... 521/155
2005/0282001 A1 * 12/2005 Jenkines et al. ............. 428/323
2006/0193802 A1 * 8/2006 Lysenko et al. ............... 424/65
2006/0276609 A1 * 12/2006 Lysenko et al. ............... 528/44
2006/0293400 A1 * 12/2006 Wiltz, Jr. et al. ............ 521/172
2007/0142544 A1 * 6/2007 Jenkines et al. ............. 524/589
2008/0096995 A1 4/2008 Bedri et al.
2008/0097044 A1 4/2008 Bhattacharjee et al.
2008/0241458 A1 * 10/2008 Jenkines ...................... 428/95
2008/0262259 A1 * 10/2008 Luo et al. ...................... 560/1
2009/0170972 A1 * 7/2009 Sonney et al. ................. 521/88
2009/0197035 A1 * 8/2009 Jenkines ...................... 428/86
2009/0197984 A1 8/2009 Bartelink et al.

FOREIGN PATENT DOCUMENTS

EP 0397036 11/1990
EP 0763555 3/1997
EP 1112243 7/2001
JP HEI 5-163342 6/1993
WO WO-2004/020497 3/2004
WO WO-2004/096882 11/2004
WO WO-2004/096883 11/2004
WO WO-2006/047431 5/2006
WO WO-2006/047433 5/2006
WO WO-2006/047434 5/2006
WO WO-2006/065345 6/2006

OTHER PUBLICATIONS

U.S. Appl. No. 11/663,466, filed Mar. 22, 2007.

* cited by examiner

*Primary Examiner*—Cheryl Juska

(57) ABSTRACT

Polyurethane carpet backings are made using a polyurethane-forming composition that includes hydroxymethyl-containing polyester polyols. The formulation allows a significant replacement of conventional polyols with polyols derived from annually renewable resources, while maintaining important properties like edge curl, tuftbind, viscosity and good curing rates.

36 Claims, No Drawings

POLYURETHANE CARPET BACKINGS MADE USING HYDROXYMETHYLATED POLYESTER POLYOLS

This application claims benefit of U.S. Provisional Patent Application No. 60/622,219, filed Oct. 25, 2004.

The invention relates to tufted or woven carpet having a polyurethane backing, and to methods of making such carpet.

Tufted carpets are manufactured by tufting fiber bundles through a primary backing and securing them to the primary backing with a precoat. The tufted carpets may also have additional layers such as a laminate layer, a secondary backing layer and a foam layer. Woven carpets are often manufactured similarly, except that the fiber bundles are woven through the primary backing.

The precoat anchors the fiber bundles to the primary backing, providing fiber lock properties like good pilling and fuzzing resistance, good tuftbind and good edge ravel. In addition, the precoat is usually called upon to contribute to other desirable attributes of the carpet such as dimensional stability, flame retardancy, antimicrobial/antifungal activity and liquid barrier functionality.

The tufted or woven carpet is often laminated to a so-called "secondary backing", which provides characteristics such as improved dimensional stability and/or acts as a release backing that allows the carpet to be easily removed from a glue-down installation. A laminate layer is commonly used to adhere this secondary backing to the carpet.

Polyurethanes can be used as the precoat and/or the laminate layer. Polyurethane precoat systems are described, for example, in U.S. Pat. No. 4,296,159 to Jenkines et al. and U.S. Pat. No. 4,696,849 to Mobley et al. Polyurethane precoat systems of this type are useful as the laminate layer, too. The polyurethanes described in these patents are formed from a polyisocyanate and a polyol compound. The polyol compounds that are most widely used in polyurethane applications, including carpet precoats, are polyether or polyester polyols that are derived mainly from petroleum-based feedstocks. It is desirable to replace all or part of the conventional, petroleum-based polyols with an alternative polyol that is based on a renewable feedstock. Conventional polyol prices tend to fluctuate with crude oil pricing, which is becoming increasingly volatile due to dwindling proven reserves, increased global demand and an uncertain geopolitical climate. Further, many countries do not have domestic oil reserves, but have large agricultural industries that could produce vegetable oil feedstocks for making alternative polyols, if those polyols perform well from both technological and economical standpoints.

Most vegetable oils are mixtures of fatty acid triglycerides that do not have isocyanate-reactive functionality. It is therefore necessary to modify the triglycerides to introduce the needed functional groups. This is commonly accomplished by performing a transesterification reaction between a polyol compound and either the triglyceride itself or a fatty acid or fatty acid ester obtained from the triglyceride. This reaction creates compounds having one or two fatty acid ester groups and one or more free hydroxyl groups. In order to increase the hydroxyl functionality, the triglycerides or corresponding fatty acids can be "blown" or reacted with moist air to couple them.

These vegetable oil-based polyols seldom represent a drop-in replacement for the conventional, petroleum-based products in most polyurethane applications. There are a number of reasons for this. One problem is that it has been difficult to regulate the functionality (number of hydroxyl groups/molecule) in these oil-based polyols. Many vegetable oil-based polyols contain a significant fraction of molecules having zero or one isocyanate-reactive group. These molecules either do not react with the polyisocyanate at all, or else act as chain terminators that reduce the polymer molecular weight and crosslink density. Another problem is that the hydroxyl groups on vegetable oil-based polyols tend to be arranged differently than on conventional polyether and polyester polyols. The conventional polyols mostly have their hydroxyl groups located at the chain ends. Vegetable oil-based polyols as described above usually have closely spaced hydroxyl groups and a free hydrocarbon tail that is not isocyanate-reactive at one end. This leads to profound differences in the chain structure of the polyurethane.

Still another problem is that the vegetable oil-based polyols are mixtures of molecules that have significant variations in their structures. This leads to still further differences in the structure of the ensuing polyurethane, compared to polyurethanes made using conventional polyols. The variations can lead to unpredictability in the properties of the polyurethane. In addition, fatty acids contained in vegetable oils vary in terms of chain length, number and position of unsaturated sites and/or functional groups (such as hydroxyl groups), among the different types of vegetable oils and even within lots of a single type of oil. This variability introduces still more unpredictability in the performance of these polyols.

It has been suggested to use certain vegetable oil-based polyols to make carpet precoats. For example, US Published Patent Applications 2002/0121328, 2002/0119321 and 2002/0090488 suggest that certain transesterified "blown" vegetable oils be used as the polyol component of a tufted carpet precoat system. However, the suitability of these polyols to produce commercially acceptable carpet has not been established, except when used in relatively small amounts. The demands on a carpet precoat are particularly high, compared to many other types of polyurethane systems, as the precoat formulation must cure quickly (in order to obtain commercially viable line speeds), have a workable viscosity, provide good tuft-binding strength and produce a dimensionally stable carpet product, while being as inexpensive as possible.

Accordingly, it is desirable to produce a polyurethane precoat and/or laminate formulation for tufted or woven carpet, which provides an acceptable set of performance properties while replacing at least some of the conventional polyol materials with a vegetable oil- or animal fat-based polyol.

In one aspect, this invention is a carpet having a substantially noncellular polyurethane carpet backing, wherein the polyurethane is the reaction product of a polyisocyanate component and a polyol component containing a mixture of isocyanate-reactive materials of which one or more optionally alkoxylated hydroxymethyl-containing polyester polyols constitutes from 25 to 90% by weight.

In a second aspect, this invention is a carpet comprising (I) a primary backing, (II) a yarn tufted or woven through the primary backing thereby creating a yarn bundle on the underside of the resulting carpet, and (III) a polyurethane applied to the underside of the carpet thereby adhering the yarn bundle to the primary backing, wherein the polyurethane is the reaction product of a polyisocyanate component and a polyol component containing a mixture of isocyanate-reactive materials of which one or more optionally alkoxylated hydroxymethyl-containing polyester polyols constitutes from 25 to 90% by weight.

This invention is a method comprising (I) applying a polyurethane-forming composition to the underside of a carpet having a primary backing and a yarn tufted or woven through the primary backing to form a yarn bundle on the underside of the carpet and (II) curing the polyurethane-forming composition to form a polyurethane coating that adheres the yarn bundle to the primary backing, wherein the polyurethane-forming composition includes a polyisocyanate component and a polyol component containing a mixture of isocyanate-reactive materials of which one or more optionally alkoxylated fatty acid amide polyols constitute from 25 to 90% by weight.

This invention is also a carpet comprising a primary backing and a secondary backing adhered directly or indirectly to the primary backing with a polyurethane laminate layer, wherein the polyurethane laminate layer is the reaction product of a polyisocyanate component and a polyol component containing a mixture of isocyanate-reactive materials of which one or more optionally alkoxylated hydroxymethyl-containing polyester polyols constitutes 25 to 90% by weight.

This invention is also a method for adhering a secondary backing to a carpet, comprising applying a polyurethane-forming composition to the secondary backing or to the carpet, joining the carpet to the secondary backing such that the polyurethane-forming composition is intermediate to the secondary backing and the carpet, and curing the polyurethane-forming composition, wherein the polyurethane-forming composition includes a polyisocyanate component and a polyol component containing a mixture of isocyanate-reactive materials of which one or more optionally alkoxylated fatty acid amide polyols constitute from 25 to 90% by weight.

It has been surprisingly found that carpet meeting necessary standards of performance for commercial applications can be prepared in accordance with the invention, using a significant proportion of a polyol derived from renewable resources such as vegetable oil or animal fat.

The carpet includes a primary backing that defines multiple openings through which a facing fiber is tufted or woven to produce a carpet face. The primary backing is generally in the form of a woven or nonwoven scrim, and can be made of any convenient material, such as, for example, jute, polypropylene, nylon, a polyester, a polyacrylate, cotton, wool, or other material. The facing fiber also can be of any convenient material such as wool, cotton, nylon, a polyester, an acrylic fiber, polypropylene, polyethylene, a blend of any two or more of these, or the like. The primary backing and the facing fiber should be stable under the conditions at which the polyurethane precoat is applied and cured, so the carpet does not degrade or become distorted. The facing fiber is typically in the form of fiber bundles that are tufted or woven through the primary backing to produce a carpet face and an opposing underside.

A polyurethane-forming composition is applied to the underside of the carpet to wet out the fiber bundles and adhere them to the primary backing. This is conveniently done by creating a puddle of the polyurethane-forming composition on the underside of the carpet and mechanically spreading the composition over the back surface. It is often convenient to froth the composition before applying it, as frothing makes it easier to control coating weight. It is preferred to use a doctor blade or similar apparatus to spread the polyurethane-forming composition, as this method mechanically pushes the polyurethane-forming composition into and between the fiber bundles and into contact with the primary backing, thereby improving the bond between the fibers and primary backing. Once applied and spread, the polyurethane-forming composition is allowed to cure to form a polyurethane polymer. This curing can occur at room temperature (~22° C.), but it is generally desirable to apply heat to accelerate the cure. A suitable curing temperature is from 100 to 200° C., such as from 110 to 150° C. It is desired that the curing temperature be such that the formulation cures to a tack-free state in 4 minutes or less, preferably 2.5 minutes or less and more preferably in 2 minutes or less.

The spreading and curing process generally will remove gasses entrapped in the polyurethane-forming composition if the composition is frothed prior to application, except if the composition contains a surfactant or other foam stabilizer. It is usually preferred that the precoat be non-cellular.

Care should be taken to minimize mechanical stresses on the carpet during the application and curing of the polyurethane precoat, as these stresses often lead to subsequent dimensional instability. The carpet is preferably stretched no more than 2% in either the weft (cross machine) or warp (machine) direction, and more preferably no more than 0.75%, during the precoating process. The carpet may be heated slightly prior to applying the polyurethane-forming composition. The carpet is preferably dry, as residual moisture can react with the polyisocyanate component of the polyurethane-forming composition to generate a gas. Gas generation leads to forming a cellular structure in the precoat or at the interface of the precoat and the carpet, which is generally undesirable.

The polyurethane-forming composition includes a polyisocyanate component and a polyol component. The polyisocyanate component includes at least one organic polyisocyanate, which may be an aromatic, cycloaliphatic, or aliphatic isocyanate. Examples of suitable polyisocyanates include m-phenylene diisocyanate, tolylene-2-4-diisocyanate, tolylene-2-6-diisocyanate, hexamethylene-1,6-diisocyanate, tetramethylene-1,4-diisocyanate, cyclohexane-1,4-diisocyanate, hexahydrotolylene diisocyanate, naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), tolylene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, tolylene-2-4-diisocyanate, tolylene-2-6-diisocyanate or mixtures thereof. Diphenylmethane-4,4'-diisocyanate, diphenylmethane-2,4'-diisocyanate and mixtures thereof are generically referred to as MDI, and all can be used. Tolylene-2,4-diisocyanate, tolylene-2,6-diisocyanate and mixtures thereof are generically referred to as TDI, and all can be used. Polyisocyanate compounds or mixtures thereof having from about 1.8 to about 2.5 isocyanate groups/molecule, on average, are preferred, especially those having an average of about 1.9 to about 2.3 isocyanate-groups/molecule. Prepolymers made by reacting a stoichiometric excess of any of the foregoing polyisocyanates with an isocyanate-reactive compound such as those described below can be used as well.

The polyol component includes a mixture of isocyanate-reactive compounds. For, 25 to 90%, such as from 25 to 75%, from 30 to 60% or from 30 to 50%, of the total weight isocyanate-reactive compounds is one or more hydroxymethyl-containing polyester polyols.

The hydroxymethyl-containing polyester polyol(s) have an average of at least 1.8, preferably at least 2.0 hydroxyl, primary and secondary amine groups combined per molecule. Hydroxyl groups are preferred. The hydroxymethyl group-containing polyester polyol may have an average of up to 3 hydroxyl, primary and secondary amine groups combined per molecule, but preferably no more than about 2.5 such groups and even more preferably no more than about 2.25 such groups. The hydroxymethyl-containing polyester polyol has an equivalent weight of at least 400, such as at least about 600, at least about 650, at least about 700, or at least about 725, to about 15,000, such as to about 6000, to about 3500, up to about 1700, up to about 1300, or to about 1000. Equivalent weight is equal to the number average molecular weight of the molecule divided by the combined number of hydroxyl, primary amine and secondary amine groups.

Hydroxymethyl-containing polyester polyols of this type are described in detail in WO 04/096882 and WO 04/096883. The hydroxymethyl-containing polyester polyol is conveniently prepared by reacting a hydroxymethyl-group containing fatty acid having from 12 to 26 carbon atoms, or an ester of such a hydroxymethylated fatty acid, with a polyol, hydroxylamine or polyamine initiator compound having an average of at least 2.0 hydroxyl, primary amine and/or secondary amine groups/molecule. Proportions of starting materials and reaction conditions are selected such that the resulting hydroxymethyl-containing polyester polyol contains an average of at least 1.3 repeating units derived from the hydroxymethyl-group containing fatty acid or ester thereof for each hydroxyl, primary amine and secondary amine group in the initiator compound, and the hydroxymethyl-containing polyester polyol has an equivalent weight of at least 400 up to about 15,000.

The hydroxymethyl-containing polyester polyol advantageously is a mixture of compounds having the following average structure:

$$[H—X]_{(z\text{-}p)}—R—[X—Z]_p \qquad (I)$$

wherein R is the residue of an initiator compound having z hydroxyl and/or primary or secondary amine groups, where z is at least two; each X is independently —O—, —NH— or —NR'— in which R' is an inertly substituted alkyl, aryl, cycloalkyl, or aralkyl group, p is a number from 1 to z representing the average number of [X—Z] groups per hydroxymethyl-containing polyester polyol molecule, Z is a linear or branched chain containing one or more A groups, provided that the average number of A groups per molecule is ≧1.3 times z, and each A is independently selected from the group consisting of A1, A2, A3, A4 and A5, provided that at least some A groups are A1, A2 or A3. A1 is:

(II)

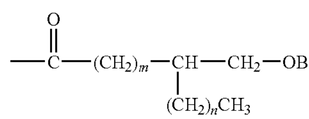

wherein B is H or a covalent bond to a carbonyl carbon atom of another A group; m is number greater than 3, n is greater than or equal to zero and m+n is from 8 to 22, especially from 11 to 19. A2 is:

(III)

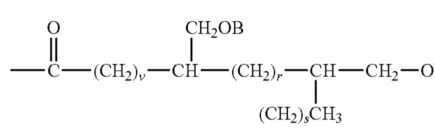

wherein B is as before, v is a number greater than 3, r and s are each numbers greater than or equal to zero with v+r+s being from 6 to 20, especially 10 to 18. A3 is:

(IV)

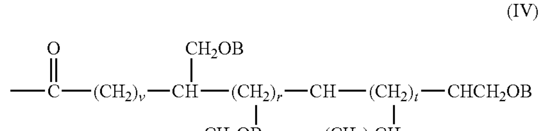

wherein B, v, each r and s are as defined before, t is a number greater than or equal to zero, and the sum of v, r, s and t is from 5 to 18, especially from 10 to 18. A4 is $$—C(=O)—(CH_2)_w—CH_3 \qquad (V)$$

where w is from 10-24, and A5 is $$—C(=O)—R' \qquad (VI)$$

where R' is a linear or branched alkyl group that is substituted with at least one cyclic ether group and optionally one or more hydroxyl groups or other ether groups. The cyclic ether group may be saturated or unsaturated and may contain other inert substitution. The hydroxyl groups may be on the alkyl chain or on the cyclic ether group, or both. The alkyl group may include a second terminal —C(O)— or —C(O)O— group through which it may bond to another initiator molecule. A5 groups in general are lactols, lactones, saturated or unsaturated cyclic ethers or dimers that are formed as impurities during the manufacture of the hydroxylmethyl-group containing fatty acid or ester. A5 groups may contain from 12 to 50 carbon atoms.

In formula I, n is preferably from 2 to 8, more preferably from 2 to 6, even more preferably from 2 to 5 and especially from about 3 to 5. Each X is preferably —O—. The total average number of A groups per hydroxymethylated polyester polyol molecule is preferably at least 1.5 times the value of z, such from about 1.5 to about 10 times the value of z, about 2 to about 10 times the value of z or from about 2 to about 5 times the value of z.

A is preferably A1, a mixture of A1 and A2, a mixture of A1 and A4, a mixture of A1, A2 and A4, a mixture of A1, A2 and A3, or a mixture of A1, A2, A3 and A4, in each case optionally containing a quantity of A5. Mixtures of A1 and A2 preferably contain A1 and A2 groups in a mole ratio of 10:90 to 95:5, particularly from 60:40 to 90:10. Mixtures of A1 and A4 preferably contain A1 and A4 groups in a mole ratio of 99.9:0.1 to 70:30, especially in a ratio of from 99.9.0.1 to 85:15. Mixtures of A1, A2 and A4 preferably contain from about 10 to 95 mole percent A1 groups, 5 to 90 percent A2 groups and up to about 30 percent A4 groups. More preferred mixtures of A1, A2 and A4 contain about 25-70 mole-% A1 groups, 15-40% A2 groups and up to 30% A4 groups. Mixtures of A1, A2 and A3 preferably contain from about 30-80 mole-% A1, from 10-60% A2 and from 0.1 to 10% A3 groups. Mixtures of A1, A2, A3 and A4 groups preferably contain from 20 to 60 mole percent A1, 1 to about 65 percent A2, from 0.1 to about 10 percent A3 and up to 30 percent A4 groups. Especially preferred polyester polyols of the invention contain a mixture of about 20-50% A1 groups, 20-50% A2 groups, 0.5 to 4% A3 groups and 15-30% A4 groups. In all cases, A5 groups advantageously constitute from 0-7%, especially from 0-5%, of all A groups.

Preferred mixtures of A groups conveniently contain an average of about 0.8 to about 1.5 —$CH_2OH$ and/or —$CH_2OB$ groups/A group, such as from about 0.9 to about 1.3 —$CH_2OH$ and/or —$CH_2OB$ groups/A group or from about 0.95 to about 1.2 $CH_2OH$ and/or —$CH_2OB$ groups/A group. Such proportions of A groups (1) allow the initiator functionality to mainly determine the functionality the polyester polyol and (2) tend to form less densely branched polyester polyols.

"Inertly substituted" groups are groups that do not react with an isocyanate group and which do not otherwise engage in side reactions during the preparation of the hydroxymethyl-group containing polyester polyol. Examples of such inert substituents include aryl, cycloalkyl silyl halogen (especially fluorine, chlorine or bromine), nitro, ether, ester, and the like.

The hydroxymethyl-containing polyester polyol generally contains some unreacted initiator compound, and may contain unreacted hydroxymethylated fatty acids (or esters). Initiator compounds often react only monofunctionally or difunctionally with the fatty acids (or esters), and resulting polyester polyol often contains free hydroxyl or amino groups bonded directly to the residue of the initiator compound.

The hydroxymethyl-containing polyester polyol may be alkoxylated, if desired, to introduce polyether chains onto one or more of the hydroxymethyl groups. The hydroxymethyl-containing polyester polyol may also be aminated through reaction with ammonia or a primary amine, followed by hydrogenation, to replace the hydroxyl groups with primary or secondary amine groups. Primary or secondary amine groups can also be introduced by capping the polyester polyol with a diisocyanate, and then converting the terminal isocyanate groups so introduced to amino groups through reaction with water.

The polyol component includes other isocyanate-reactive materials in addition to the hydroxymethyl-containing polyester polyol. These other materials may constitute from 10% up to 80% of the total weight of all isocyanate-reactive materials (including the hydroxymethylated polyester polyol materials described above). These other isocyanate-reactive materials include those having an average of from 2 to 6, especially from 2 to 3 isocyanate-reactive groups per molecule. The isocyanate-reactive groups are preferably primary or secondary hydroxyl groups, but may be amino groups or other isocyanate-reactive groups.

The additional isocyanate-reactive materials preferably include at least one high equivalent weight polyol having a hydroxyl equivalent weight of at least 400, especially from about 500 to about 1500 and preferably from 800 to 1200. This polyol preferably has a nominal functionality of 2 to 3 and an actual functionality in the range of 1.8 to 3.0. The "nominal" functionality is the number of functional groups expected to be present on the polyol based on the composition of the starting materials. The actual functionality is sometimes somewhat lower, especially with polyether polyols which tend to contain some terminal unsaturation that reduces average functionality somewhat.

The additional high equivalent weight polyol may be a polyether polyol, such as a polymer of ethylene oxide, propylene oxide, tetrahydrofuran or butylene oxide, or a mixture of two or more of these. Particularly suitable polyether polyols include polymers of propylene oxide, random copolymers of propylene oxide and ethylene oxide, especially those containing up to about 16% by weight randomly polymerized ethylene oxide, and oxyethylene-capped polymers of propylene oxide or propylene oxide-ethylene oxide random copolymers. These polyols are conveniently prepared by adding the corresponding alkylene oxide to an initiator material such as a low molecular weight compound containing two or more hydroxyl and/or primary or secondary amine groups.

Polyester polyols such as polycaprolactone and butanediol/adipate polyesters can also be used as an additional high equivalent weight polyol.

The additional high equivalent weight polyol will in general constitute from about 10 to about 80% of the total weight of the isocyanate-reactive materials. Preferably, it will constitute about 30-65% by weight, and especially from about 40-65% by weight of the isocyanate-reactive materials.

A chain extender is also preferably present in the polyol composition. For purposes of this invention, a chain extender is a material other than the hydroxymethyl-containing polyester polyol and the additional high equivalent weight polyols discussed above, having two isocyanate-reactive groups/molecule and an equivalent weight per isocyanate-reactive group of from about 30 to 150. Chain extenders having two hydroxyl groups are preferred. Examples of suitable chain extenders include ethylene glycol, diethylene glycol, triethylene glycol, propylene glycol, dipropylene glycol, tripropylene glycol, 1,4-dimethylolcyclohexane, diethyltoluene diamine, 1,4-butane diol, 1,6-hexane diol, 1,3-propane diol, amine-terminated polyethers such as Jeffamine D-400 (from Huntsman Chemical Company), amino ethyl piperazine, 2-methyl piperazine, 1,5-diamino-3-methyl-pentane, isophorone diamine, ethylene diamine, hexane diamine, hydrazine, piperazine, mixtures thereof and the like. Amine chain extenders can be blocked, encapsulated, or otherwise rendered less reactive. Chain extenders advantageously constitute up to about 20%, especially up to about 15% of the combined weight of all isocyanate-reactive materials.

It is also within the scope of the invention to include a crosslinker in the polyol composition. A crosslinker, for purposes of this invention, is a compound having three or more isocyanate reactive groups and an equivalent weight per isocyanate-reactive group of 150 or less. However, the use of crosslinkers is generally discouraged because their use tends to increase edge curl. Therefore, crosslinkers are most preferably eliminated or used in small quantities. The isocyanate-reactive groups may be hydroxyl, primary amine or secondary amine groups.

Preferably, the reactive ingredients (i.e., the polyisocyanates and isocyanate-reactive compounds) are selected so that collectively they have an average of about 1.8 to about 2.5, especially from about 1.8 to about 2.3, reactive groups per molecule. The somewhat low average functionality produces a polyurethane that is at most only lightly crosslinked, which promotes dimensional stability in the carpet, as evidenced by low edge curl values.

It is most preferred to select the reactive components and polyisocyanate index to provide a balanced overall functionality, such as described, for example, in U.S. Pat. No. 4,696,849. A particularly preferred average actual functionality for the isocyanate-reactive components is from 1.97 to 2.03. A particularly preferred isocyanate index is from 85 to about 125.

The polyurethane-forming composition preferably contains a filler, which reduces overall cost and may improve flame resistance and other physical properties. The filler advantageously constitutes from about 20 to about 80 percent, such from 30 to 70, 50 to 65 or 55 to 60 percent, of the total weight of the polyurethane-forming composition. Suitable fillers include talc, mica, montmorillonite, marble, milled glass granite, milled glass, calcium carbonate, aluminum trihydrate, carbon, aramid, silica, silica-alumina, zirconia, talc, bentonite, antimony trioxide, kaolin, coal based fly ash and boron nitride.

The polyurethane-forming composition also preferably contains one or more catalysts, which promote the reaction of the polyisocyanate with the isocyanate-reactive materials. Suitable catalysts include tertiary amines, organometallic compounds, or mixtures thereof. Specific examples of these include di-n-butyl tin bis(mercaptoacetic acid isooctyl ester), dimethyltin dilaurate, dibutyltin dilaurate, dibutyltin diacetate, dibutyltin sulfide, stannous octoate, lead octoate, ferric acetylacetonate, bismuth carboxylates, triethylenediamine, N-methyl morpholine, like compounds and mixtures thereof. An amine-blocked tin (IV) catalyst, such as those described in U.S. Pat. No. 5,491,174, can be used. An amount of catalyst is advantageously employed such that a relatively rapid cure to a tack-free state can be obtained, while providing enough open time that the polyurethane composition can be dispensed and spread over the carpet back before curing. If an organometallic catalyst is employed, such a cure can be obtained using from about 0.01 to about 0.5 parts per 100 parts of the polyurethane-forming composition, by weight. If a tertiary amine catalyst is employed, the catalyst preferably provides a suitable cure using from about 0.01 to about 3 parts of tertiary amine catalyst per 100 parts of the polyurethane-forming composition, by weight. An amine type catalyst and an organometallic catalyst can be employed in combination.

Other additives may be used, including fire retardants, pigments, antistatic agents, reinforcing fibers, antioxidants, preservatives, acid scavengers, and the like. It is usually preferred not to include a blowing agent. Components are preferably dried to remove residual water. The polyurethane-forming composition preferably contains less than 0.1% by weight water, so as to avoid a gas-generating reaction with the polyisocyanate. In order to provide a non-cellular coating, it is preferred to eliminate or minimize the presence of surfactants and foam stabilizers. The elimination of these materials permits the formulation to be frothed in order to control coating weight, while then allowing the entrapped gases to escape before the formulation is cured.

The polyurethane composition is conveniently formed into a blended polyol component, which includes all isocyanate-reactive materials, and a polyisocyanate component. The filler is typically blended into the polyol component. Catalysts may be added to either the polyol or polyisocyanate component (preferably the polyol component) or added as one or more separate streams. The amount of polyisocyanate used is conveniently sufficient to provide an isocyanate index, i.e. 100 times the ratio of NCO groups to isocyanate-reactive groups in the reaction mixture of from about 95 to about 140, preferably about 85 to 125, and especially from about 100 to 115.

A convenient coating weight is from about 20 to about 45 ounces/square yard (0.68-1.53 kg/$m^2$), and in particular from about 25-35 ounces per square yard (0.85-1.19 kg/$m^2$). At such coating weights, the precoated carpet advantageously exhibits a tuftbind, measured according to ASTM D1335, of at least 10 lb (44.5N), more preferably at least 13 lb (58N) and even more preferably at least 15 lb (67N). Normalized to coating weight, the tuftbind is advantageously at least 0.40 lb/ounce/square yard (5.38 $m^{-2}$), preferably at least 0.48 (6.46 $m^{-2}$) and more preferably at least about 0.52 lb/ounce/square yard (7 $m^{-2}$), with coating weights in the 25-35 ounce/square yard (0.85-1.19 kg/$m^2$) range. Wet tuftbind values are advantageously at least 5.5 lb (24N), more preferably at least 8.8 lb (39N) and even more preferably at least 11 lb (49N). Normalized to coating weight (for coating weights in the 25-35 ounces/square yard (0.85-1.19 kg/$m^2$) range), wet tuftbinds of at least 0.26 lb/ounce/square yard (3.5 $m^{-2}$), such as at least 0.35 (4.71 $m^{-2}$) or at least 0.40 lb/ounce/square yard (5.38 $m^{-2}$) are desirable. Wet tuftbind is measured according to ASTM D1335 after soaking the carpet sample in room temperature tap water for 20 minutes.

The precoated carpet desirably has an edge curl of no greater than 2.54 cm, preferably no greater than 1.8 cm, more preferably no greater than 1.3 cm and even more preferably no greater than 0.8 cm, in each of the machine and cross machine direction.

The precoated carpet also advantageously exhibits excellent pilling and fuzzing resistance and high edge ravel (such as greater than >78N, especially greater than 98N or greater than 108N on the test described below). The coated carpet preferably exhibits a "hand punch" (a measure of flexibility described below) of 133N or less. The precoated carpet also advantageously exhibits good flame retardancy, antimicrobial/antifungal activity, low 24-hour total volatile organic components (TVOC), good liquid barrier functionality as measured by the British spill passage test (United Kingdom Health Care Specifications Method E), and excellent castor chair resistance to backing delamination and zippering (measured according to the Feingerate Baumberg Roller Chair Testing Device, ASTM D6962).

The carpet of the invention may contain components in addition to those described above. Examples of these include a secondary backing, an attached foam cushion, a non-woven secondary fabric, a release layer, one or more moisture barrier layers, and the like. The precoat formulation described herein may be used to adhere any of these additional components to the carpet structure. For example, a secondary backing may be laid into the precoat layer prior to the curing step. Subsequent curing of the precoat layer will then bond the secondary backing to the carpet. It is possible to apply the precoat to the secondary backing first, and then bring the tufted or carpet into contact with the precoated secondary backing, followed by a curing step. However, this latter method often does not permit good penetration of the precoat into and around the fiber bundles, and tuftbind and other properties sometimes suffer as a result.

It is preferred to separate the precoating and curing steps from steps that attach secondary backings and/or other components to the structure. Accordingly, in a preferred process, the precoat formulation of the invention is coated on the back of the carpet, spread so it penetrates through and between the tufted or woven fiber bundles, and cured. If it is then desired to use this polyurethane formulation as a lamination layer for attaching a secondary backing or other component, an additional layer of the formulation is then applied (atop the precoat layer or onto the other component), the carpet and secondary backing or other component are brought together, and the polyurethane is cured.

The carpet backings of the invention have particular applicability in the residential and commercial carpet industry as well as in carpeting for recreational use, such as boats, cars, patios, synthetic tuft, etc. A preferred practice is to use the precoat formulations of this invention as scrape-down unitary coatings for artificial or synthetic tuft for football fields, soccer fields and the like.

The following examples will illustrate the practice of the present invention in their preferred embodiments. All parts and percentages are by weight unless otherwise indicated. Unless stated otherwise, all molecular weights expressed herein are weight average molecular weight.

EXAMPLES

The following materials are employed in these examples:

Hydroxymethyl containing polyester polyol A (HMPP A) is prepared by reacting 2048.6 g (6.23 moles) of a hydroxymethylated soybean oil and 467.2 g (1.168 moles) of a difunctional, 400 molecular weight poly(ethylene oxide). HMPP A has an OH number of 71.28 and a functionality of about 2.4.

Soy Oil Polyol A is a 130-OH-number functional blown soy oil polyol transesterified with a blend of sucrose and glycerin, sold as SoyOyl™ GC5N by Urethane Soy Systems Corporation.

Polyether Polyol A is a 2000 molecular weight, nominally difunctional poly(propylene oxide). It is available commercially as Voranol® 9120A polyol from Dow Chemical.

Polyether Polyol B is a 2000 molecular weight, nominally difunctional polypropylene oxide) end-capped with 12 percent ethylene oxide, available commercially as Voranol® 9287A polyol from Dow Chemical.

Calcium carbonate A is a quarried calcium carbonate ground such that 70 weight percent passes through a 325 mesh screen. It is available commercially as Georgia Marble D70 from Georgia Marble Company.

Polyisocyanate A is a 50/50 blend of a 2.3 functional, 32%-NCO polymeric MDI and an MDI prepolymer (181 I.E.). 2,4'-MDI constitutes 14% of the total weight of the polymeric MDI. The MDI prepolymer is made from dipropylene glycol, tripropylene glycol and a pure MDI containing 2.6 weight percent of the 2,4'-isomer. Polyisocyanate A is commercially available as Isonate®7594A isocyanate from Dow Chemical.

Catalyst A is a blend of 10% of a dibutyltin diisooctylmercaptoacetate delayed action catalyst, commercially available as Fomrez™ UL6 from OSI Specialties, in Polyether Polyol B Catalyst B is a blend of 20% dibutyltin dilaurate (Dabco™ T12, from Air Products and Chemicals, Inc.) in Polyether Polyol B.

Example 1 and Comparative Sample A

A polyol blend is prepared from the following components:

TABLE 1

| Ingredient | Parts By Weight | |
|---|---|---|
| | Example 1 | Comparative Sample A* |
| HMPP A | 45 | 0 |
| Soy Oil Polyol A | 0 | 25 |
| Polyether polyol A | 40 | 0 |
| Polyether polyol B | 0 | 64 |
| Dipropylene Glycol | 15 | 5.5 |
| Tripropylene Glycol | 0 | 5.5 |
| Calcium Carbonate A | 205 | 160 |
| Organotin Catalyst A | 0.45 | 0.60 |
| Organotin Catalyst B | 0 | 0.60 |
| Polyisocyanate A | 60.1 | 48.75 |
| % Polyols from Vegetable oils | 28 | 16.8 |
| % Filler | 56.1 | 51.8 |

*Not an example of the invention.

In each case, the polyols, chain extenders and filler are blended using a 2.54 cm diameter Cowels blade at about 49° C. The compounded polyol blend is then cooled to 25° C. At that temperature, the compounded polyol blend of Example 1 has a Brookfield viscosity (#6 spindle, 20 rpm) of 23,800 cps. The viscosity of Comparative Sample A is 9,900 cps.

305 parts of the compounded polyol blend are mixed with the polyisocyanate and catalysts. The mixture is immediately deposited onto the back of a tufted carpet designated Certificate style 2485 (J&J Industries, Inc.). It is spread and worked into the fiber bundles using a coating knife. The coated carpet is then heated in an oven at 130° C. for 6 minutes.

The precoated carpet is allowed to condition for one day under ASTM D1335 conditions, and is tested for coating weight, hand, tuftbind, wet tuftbind, edge ravel and edge curl. Tuftbind is measured according to ASTM D1335. Wet tuftbind is measured according to ASTM D1335, after first immersing the sample in room temperature tap water for 20 minutes.

Edge curl is measured by first submerging three 2"×6" (5 cm×15 cm) carpet samples in room temperature water for 30 seconds. Excess water is shaken off the samples and they are placed face up on a flat surface. A panel is applied over the sample, leaving a 2"×2" (5 cm×5 cm) portion exposed. After 30 minutes, the distance from the flat surface to the underside of the outer exposed edge of the carpet sample is measured. The average of the three measurements is reported as the edge curl.

Hand punch is measured by a test that simulates the action of pushing the carpet into a corner during installation. A 9"×12" (21.6 cm×30.5 cm) sample of the carpet is conditioned at 50% relative humidity and 25° C. for two hours. The carpet is placed face up over a hollow cylinder with a 5.5" (14 cm) internal diameter. An Instron 4465 tensile tester is equipped with a 1 kN compression/extension load cell and a compression foot having a 2.25" (5.7 cm) outside diameter. The compression foot is then forced 0.65 inch (1.65 cm) into the carpet at a rate of 12 inches/minute (30 cm/minute). The force at 0.5 inch (1.27 cm) deflection is reported. The test is repeated three more times, with the carpet being reversed each time. "Hand" is the average of the four measurements.

Edge ravel is measured on samples conditioned at ~21° C. and ~50% humidity for 24 hours. Tuft rows are pulled from the sample until two complete rows are pulled out. About 1½ to 2 inches (4-5 cm) of a third row is pulled out, leaving the resulting partially pulled row otherwise attached to the carpet. The sample is placed in the lower jaw of an Instron 4465 tensile tester equipped with 100 lb (45 kg) tension cell, and the free end of the partially pulled tuft row is placed in the upper jaw. The jaws are then pulled apart at the rate of 10 inches (25.4 cm)/minute. The force is measured on three duplicate sample and the average reported as edge ravel.

Results are as given in Table 2.

TABLE 2

| Property | Example 1 | Comp. Sample A* |
|---|---|---|
| Coating Weight, ounces/square yard (kg/m$^2$) | 36.2 (1.2) | 26.5 (0.9) |
| Hand, lb. (N) | 25.4 (113) | 5.5 (24) |
| Tuftbind, lb. (N) | 19.6 (87) | 9.5 (42) |
| Tuftbind/coating weight, lb./ounces/sq. yd (m$^{-2}$) | 0.54 (7.3) | 0.36 (4.8) |
| Wet tuftbind, lb. (kg) | 18.1 (81) | 7.2 (32) |
| Wet tuftbind/coating weight, lb./ounces/sq. yd (m$^{-2}$) | 0.5 (6.7) | 0.27 (3.6) |
| Wet tuftbind retention | 92.3% | 75.8% |
| Edge Ravel, lb. (kg) | 2.5 (11) | 1.5 (7) |
| Wet Edge Ravel, lb. (kg) | 3.2 (14) | 1.1 (5) |
| Edge Curl, machine direction, inch (cm) | 0.9 (2.3) | 0.2 (0.5) |

*Not an example of the invention.

The precoat made in accordance with the invention exhibits significantly greater tuftbind and edge ravel values, compared to the precoat containing the blown soy oil polyol, despite having a greater level of polyols from renewable materials and a higher filler level. Edge curl values are a little higher for Example 1, but are acceptable commercially. Reduction of the functionality of the hydroxymethyl-containing polyester polyol to closer to 2.0 is expected to reduce the amount of edge curl that is seen.

Example 2 and Comparative Sample B

Precoat Example 2 and Comparative Sample B are prepared and tested in the same general manner as described for Example 1, using formulations as described in Table 3. In this case, the formulations are adjusted so each polymer contains about 19% of polyols made from renewable resources, and each contains about 56% filler. Test results are as described in Table 4.

TABLE 3

| Component | Example 2 | Comp. Sample B* |
|---|---|---|
| HMPP A | 30 | 0 |
| Soybean Oil Polyol A | 0 | 30 |
| Polyether Polyol A | 55 | 57.8 |
| Dipropylene glycol | 15 | 12.2 |
| Calcium Carbonate A | 205 | 205 |
| Catalyst A | 0.45 | 0.45 |
| Water content (est.) | 0.06 | 0.06 |
| Polyisocyanate A | 59.50 | 58.18 |
| Vegetable oil-based polyol as % of reactants | 18.76 | 18.91 |
| Vegetable oil-based polyol as % of formulation | 8.22 | 8.25 |
| % Filler | 56.16 | 56.37 |

*Not an example of the invention.

TABLE 4

| Property | Example 2 | Comp. Sample B* |
|---|---|---|
| Brookfield Viscosity, #6 spindle 20 rpm, 22° C. | 18,700 | 42,650 |
| Compatability with Polyether Polyol A | Miscible | Separates |
| Tack Free Time, 130° C., min. | 2 | 4 |
| Coating Weight, ounces/square yard (kg/$m^2$) | 33.1 (1.1) | 37.5 (1.3) |
| Hand, lb. (N) | 21.8 (97) | 21.0 (93) |
| Tuftbind, lb. (N) | 21.0 (93) | 15.5 (69) |
| Tuftbind/coating weight, lb./ounces/sq. yd ($m^{-2}$) | 0.63 (8.5) | 0.56 (7.5) |
| Wet tuftbind, lb. (N) | 17.4 (77) | 12.6 (56) |
| Wet tuftbind/coating weight, lb./ounces/sq. yd ($m^{-2}$) | 0.53 (7.2) | 0.34 (4.6) |
| Wet tuftbind retention | 82.9 | 81.3 |
| Edge Curl, machine direction, inch (cm) | 1.0 (2.5) | 0.5 (1.3) |

*Not an example of the invention.

Example 2 exhibits significantly superior hand and tuft binds, compared to Comparative Sample B. Edge curl value is higher, but acceptable and expected to decrease with the use of a lower functionality hydroxymethyl-containing polyester polyol.

From the foregoing, it will be observed that numerous variations and modifications may be effected without departing from the true spirit and scope of the novel concepts of the invention.

What is claimed is:

1. A carpet comprising (I) a primary backing, (II) a yarn tufted or woven through the primary backing thereby creating a yarn bundle on the underside of the resulting carpet, and (III) a polyurethane applied to the underside of the carpet thereby adhering the yarn bundle to the primary backing, wherein the polyurethane is the reaction product of a polyisocyanate component and a polyol component containing a mixture of isocyanate-reactive materials of which one or more optionally alkoxylated hydroxymethyl-containing polyester polyols constitute about 25-90% by weight, wherein prior to alkoxylation, the hydroxymethyl-containing polyester polyol(s) having the following average structure:

$$[H-X]_{(z-p)}-R-[X-Z]_p \quad (I)$$

wherein R is the residue of an initiator compound having z hydroxyl and/or primary or secondary amine groups, where z is at least two; each X is independently —O—, —NH— or —NR'— in which R' is an inertly substituted alkyl, aryl, cycloalkyl, or aralkyl group, p is a number from 1 to z representing the average number of [X—Z] groups per hydroxymethyl-containing polyester polyol molecule, Z is a linear or branched chain containing one or more A groups, provided that the average number of A groups per molecule is ≧1.3 times z, and each A is independently selected from the group consisting of A1, A2, A3, A4 and A5, provided that A1 comprises about 20-50 mole-% of the A groups, A2 comprises about 1-65 mole-% of the A groups, A3 comprises about 0.1-10 mole-% of the A groups, A4 comprises about 0-30 mole-% of the A groups, and A5 comprises about 0-7 mole-% of the A groups, and in which A1 is:

(II)

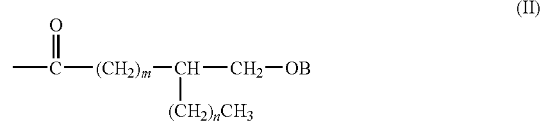

wherein B is H or a covalent bond to a carbonyl carbon atom of another A group; m is number greater than 3, n is greater than or equal to zero and m+n is from 8 to 22, A2 is:

(III)

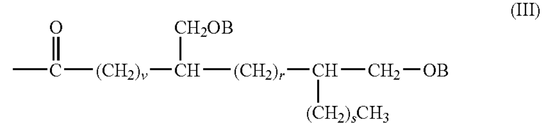

wherein B is as before, v is a number greater than 3, r and s are each numbers greater than or equal to zero with v+r+s being from 6 to 20, A3 is:

(IV)

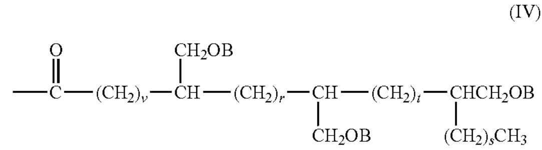

wherein B, v, each r and s are as defined before, t is a number greater than or equal to zero, and the sum of v, r, s and t is from 5 to 18, A4 is $$-\overset{O}{\overset{\|}{C}}-(CH_2)_w-CH_3 \quad (V)$$

where w is from 10-24, and A5 is $$-\overset{O}{\overset{\|}{C}}-R' \quad (VI)$$

where R' is a linear or branched alkyl group that is substituted with at least one cyclic ether group and optionally one or more hydroxyl groups or other ether groups.

2. The carpet of claim 1, wherein the hydroxymethyl-containing polyester polyol is not alkoxylated.

3. The carpet of claim 2, wherein R is a polyether group.

4. The carpet of any of claims 1-3, wherein the optionally alkoxylated hydroxymethyl-containing polyester polyol has an average of 2.0 to about 2.5 hydroxyl groups/molecule.

5. The carpet of any of claims 1-3, wherein the optionally alkoxylated hydroxymethyl-containing polyester polyol has an average equivalent weight of from 400 to about 1300.

6. The carpet of claim 1, wherein the optionally alkoxylated hydroxymethyl-containing polyester polyol(s) constitute about 25-60% by weight of the isocyanate-reactive materials.

7. The carpet of claim 6, wherein the optionally alkoxylated hydroxymethyl-containing polyester polyol(s) constitute about 30-55% by weight of the isocyanate-reactive materials.

8. The carpet of claim 1, wherein the isocyanate-reactive materials include an additional high equivalent weight polyol.

9. The carpet of claim 8, wherein the high equivalent weight polyol is a polyether polyol.

10. The carpet of claim 1, wherein the isocyanate-reactive materials include a chain extender.

11. The carpet of claim 1, wherein the polyisocyanate component and the isocyanate-reactive component are each devoid of a surfactant or foam stabilizer.

12. The carpet of claim 1, further comprising a secondary backing.

13. The carpet of claim 12, wherein the secondary backing is adhered to the carpet with a polyurethane.

14. The carpet of claim 13, wherein the polyurethane that adheres the secondary backing to the carpet is the reaction product of a polyisocyanate component and a polyol component containing a mixture of isocyanate-reactive materials of which one or more optionally alkoxylated hydroxymethyl-containing polyester polyol(s) constitute about 5-70% by weight.

15. A method comprising (I) applying a polyurethane-forming composition to the underside of a carpet having a primary backing and a yarn tufted or woven through the primary backing to form a yarn bundle on the underside of the carpet and (II) curing the polyurethane-forming composition to form a polyurethane coating that adheres the yarn bundle to the primary backing, wherein the polyurethane-forming composition includes a polyisocyanate component and a polyol component containing a mixture of isocyanate-reactive materials of which one or more optionally alkoxylated hydroxymethyl-containing polyester polyol(s) constitute from about 25-90% by weight, wherein prior to alkoxylation, the hydroxymethyl-containing polyester polyol(s) having the following average structure:

$$[H—X]_{(z-p)}—R—[X—Z]_p \qquad (I)$$

wherein R is the residue of an initiator compound having z hydroxyl and/or primary or secondary amine groups, where z is at least two; each X is independently —O—, —NH— or —NR'— in which R' is an inertly substituted alkyl, aryl, cycloalkyl, or aralkyl group, p is a number from 1 to z representing the average number of [X—Z] groups per hydroxymethyl-containing polyester polyol molecule, Z is a linear or branched chain containing one or more A groups, provided that the average number of A groups per molecule is ≧1.3 times z, and each A is independently selected from the group consisting of A1, A2, A3, A4 and A5, provided that A1 comprises about 20-50 mole-% of the A groups, A2 comprises about 1-65 mole-% of the A groups, A3 comprises about 0.1-10 mole-% of the A groups, A4 comprises about 0-30 mole-% of the A groups, and A5 comprises about 0-7 mole-% of the A groups, and in which A1 is:

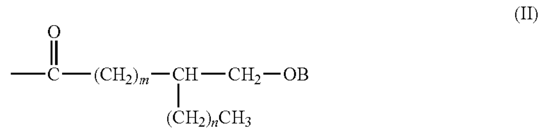

wherein B is H or a covalent bond to a carbonyl carbon atom of another A group; m is number greater than 3, n is greater than or equal to zero and m+n is from 8 to 22, A2 is:

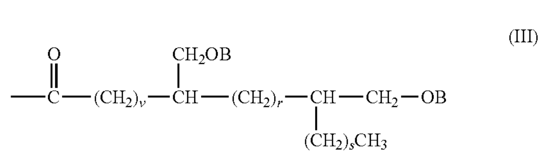

wherein B is as before, v is a number greater than 3, r and s are each numbers greater than or equal to zero with v+r+s being from 6 to 20, A3 is:

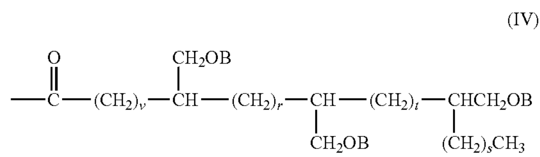

wherein B, v, each r and s are as defined before, t is a number greater than or equal to zero, and the sum of v, r, s and t is from 5 to 18, A4 is $$—C(=O)—(CH_2)_w—CH_3 \qquad (V)$$

where w is from 10-24, and A5 is $$—C(=O)—R' \qquad (VI)$$

where R' is a linear or branched alkyl group that is substituted with at least one cyclic ether group and optionally one or more hydroxyl groups or other ether groups.

16. The method of claim 15, wherein the hydroxymethyl-containing polyester polyol is not alkoxylated.

17. The method of claim 16, wherein R is a polyether group.

18. The method of any of claims 15-17, wherein the optionally alkoxylated hydroxymethyl-containing polyester polyol has an average of 2.0 to about 2.5 hydroxyl groups/molecule.

19. The method of any of claims 15-17, wherein the optionally alkoxylated hydroxymethyl-containing polyester polyol has an average equivalent weight of from 400 to about 1300.

20. The method of claim 15 wherein the isocyanate-reactive materials include a high equivalent weight polyol.

21. The method of claim 20, wherein the high equivalent weight polyol is a polyether polyol.

22. The method of claim 15, wherein the polyisocyanate component and the isocyanate-reactive component are each devoid of a surfactant or foam stabilizer.

23. The method of claim 15, further comprising the step of adhering a secondary backing to the carpet.

24. The method of claim 22, wherein the secondary backing is adhered to the carpet by applying layer of a polyurethane-forming composition between the carpet and the secondary backing, and curing the polyurethane.

25. The method of claim 23, wherein the polyurethane composition applied between the carpet and secondary backing includes a polyisocyanate component and a polyol component containing a mixture of isocyanate-reactive materials of which one or more optionally alkoxylated hydroxymethyl-containing polyols constitute from about 5-70% by weight.

26. A carpet comprising a primary backing and a secondary backing adhered directly or indirectly to the primary backing with a polyurethane laminate layer, wherein the polyurethane laminate layer is the reaction product of a polyisocyanate component and a polyol component containing a mixture of isocyanate-reactive materials of which one or more optionally alkoxylated hydroxymethyl-containing polyester polyols constitutes about 25-90% by weight, wherein prior to alkoxylation, the hydroxymethyl-containing polyester polyol(s) having the following average structure:

$$[H—X]_{(z-p)}—R—[X—Z]_p \quad (I)$$

wherein R is the residue of an initiator compound having z hydroxyl and/or primary or secondary amine groups, where z is at least two; each X is independently —O—, —NH— or —NR'— in which R' is an inertly substituted alkyl, aryl, cycloalkyl, or aralkyl group, p is a number from 1 to z representing the average number of [X—Z] groups per hydroxymethyl-containing polyester polyol molecule, Z is a linear or branched chain containing one or more A groups, provided that the average number of A groups per molecule is ≧1.3 times z, and each A is independently selected from the group consisting of A1, A2, A3, A4 and A5, provided that A1 comprises about 20-50 mole-% of the A groups, A2 comprises about 1-65 mole-% of the A groups, A3 comprises about 0.1-10 mole-% of the A groups, A4 comprises about 0-30 mole-% of the A groups, and A5 comprises about 0-7 mole-% of the A groups, and in which A1 is:

(II)

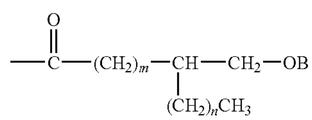

wherein B is H or a covalent bond to a carbonyl carbon atom of another A group; m is number greater than 3, n is greater than or equal to zero and m+n is from 8 to 22, A2 is:

(III)

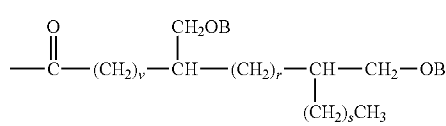

wherein B is as before, v is a number greater than 3, r and s are each numbers greater than or equal to zero with v+r+s being from 6 to 20, A3 is:

(IV)

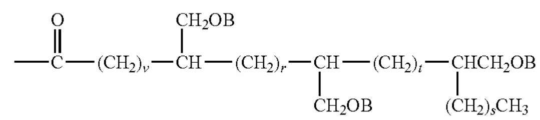

wherein B, v, each r and s are as defined before, t is a number greater than or equal to zero, and the sum of v, r, s and t is from 5 to 18, A4 is (V)

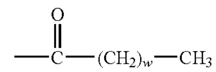

where w is from 10-24, and A5 is (VI)

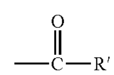

where R' is a linear or branched alkyl group that is substituted with at least one cyclic ether group and optionally one or more hydroxyl groups or other ether groups.

27. The carpet of claim 26, wherein the hydroxymethyl-containing polyester polyol is not alkoxylated.

28. The carpet of claim 27, wherein R is a polyether group.

29. The carpet of any of claims 26-28, wherein the optionally alkoxylated hydroxymethyl-containing polyester polyol has an average of 2.0 to about 2.5 hydroxyl groups/molecule.

30. The carpet of any of claims 26-28, wherein the optionally alkoxylated hydroxymethyl-containing polyester polyol has an average equivalent weight of from 400 to about 1300.

31. The carpet of claim 26, wherein the optionally alkoxylated hydroxymethyl-containing polyester polyol(s) constitute about 25-60% by weight of the isocyanate-reactive materials.

32. The carpet of claim 31, wherein the optionally alkoxylated hydroxymethyl-containing polyester polyol(s) constitute about 30-55% by weight of the isocyanate-reactive materials.

33. The carpet of claim 26, wherein the isocyanate-reactive materials include an additional high equivalent weight polyol.

34. The carpet of claim 33, wherein the high equivalent weight polyol is a polyether polyol.

35. The carpet of claim 26, wherein the isocyanate-reactive materials include a chain extender.

36. The carpet of claim 26, wherein the polyisocyanate component and the isocyanate-reactive component are each devoid of a surfactant or foam stabilizer.

* * * * *